(12) United States Patent
Makita et al.

(10) Patent No.: US 10,419,673 B2
(45) Date of Patent: Sep. 17, 2019

(54) INFORMATION PROCESSING APPARATUS AND METHOD OF CONTROLLING THE SAME

(71) Applicant: CANON KABUSHIKI KAISHA, Tokyo (JP)

(72) Inventors: Koji Makita, Yokohama (JP); Masayoshi Yamasaki, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 19 days.

(21) Appl. No.: 15/468,267

(22) Filed: Mar. 24, 2017

(65) Prior Publication Data

US 2017/0289453 A1 Oct. 5, 2017

(30) Foreign Application Priority Data

Apr. 1, 2016 (JP) .................. 2016-074599

(51) Int. Cl.
*H04N 5/232* (2006.01)
*G06F 16/51* (2019.01)
(Continued)

(52) U.S. Cl.
CPC .......... *H04N 5/23258* (2013.01); *G01S 3/00* (2013.01); *G06F 16/51* (2019.01); *G06T 7/70* (2017.01);
(Continued)

(58) Field of Classification Search
CPC ............. G01S 3/00; G06T 2207/30244; G06T 2207/10144; G06T 2207/20201; G06T 2207/20212; G06T 2207/2012; G06T 2207/2016; G06T 2207/10012; G06T 2207/10028; G06T 2207/10024; G06T 7/70; G06T 7/73; G06T 7/74; G06T 7/223; G06T 7/2006; G06T 7/0051; G06T 5/003; G06T 5/50; G06T 2200/21; G06T 2200/04; G06T 1/0007; G06T 15/20; G06T 15/205; G06T 19/20; G06T 19/006;
(Continued)

(56) References Cited

U.S. PATENT DOCUMENTS 8,073,200 B2 * 12/2011 Oi .................. G06K 9/00664
382/103
8,520,931 B2 * 8/2013 Tateno ............. G06K 9/6204
382/101

(Continued)

OTHER PUBLICATIONS

Office Action issued in European Appln. No. 17000349.5 dated Feb. 20, 2019.

(Continued)

*Primary Examiner* — Pritham D Prabhakher
(74) *Attorney, Agent, or Firm* — Rossi, Kimms & McDowell LLP

(57) ABSTRACT

An information processing apparatus acquires an image by imaging an imaging apparatus, detects an occurrence of a factor that influences a position and orientation estimation relating to an image, determines whether or not to register the acquired image based on the detected factor, and constructs an image database for estimating the position and orientation of the imaging apparatus from the image acquired by the acquisition unit using a group of images determined to be registered.

20 Claims, 7 Drawing Sheets

(51) Int. Cl.
*G06T 7/70* (2017.01)
*G01S 3/00* (2006.01)
*H04N 1/00* (2006.01)
*G06T 7/73* (2017.01)

(52) U.S. Cl.
CPC ............... *G06T 7/74* (2017.01); *H04N 1/00* (2013.01); *H04N 5/232* (2013.01); *G06T 2207/30244* (2013.01)

(58) Field of Classification Search
CPC ...... H04N 5/23258; H04N 5/232; H04N 1/00; G06F 17/3028; G06F 3/04815; G06F 3/0346
USPC ...................................................... 348/208.2
See application file for complete search history.

(56) References Cited

U.S. PATENT DOCUMENTS

| | | | |
|---|---|---|---|
| 9,426,514 B1* | 8/2016 | Chenillo | H04N 21/4312 |
| 9,442,564 B1* | 9/2016 | Dillon | G06F 3/012 |
| 9,832,452 B1* | 11/2017 | Fotland | H04N 13/20 |
| 9,947,134 B2 | 4/2018 | Komenczi | G06T 17/00 |
| 9,996,972 B1* | 6/2018 | Worley | G06Q 50/00 |
| 10,002,435 B2* | 6/2018 | Hong | G06T 7/74 |
| 2004/0175039 A1* | 9/2004 | Miller | G06K 9/00208 382/181 |
| 2007/0198955 A1* | 8/2007 | Nagatomo | G06K 9/00798 716/100 |
| 2008/0304707 A1* | 12/2008 | Oi | G06K 9/00664 382/103 |
| 2010/0086218 A1 | 4/2010 | Tateno | |
| 2010/0321510 A1 | 12/2010 | Tsutsumi | |
| 2015/0156419 A1* | 6/2015 | Aggarwal | H04N 5/23222 348/208.1 |
| 2015/0235378 A1 | 8/2015 | Rhee et al. | |
| 2015/0245020 A1* | 8/2015 | Meier | G06T 7/73 348/135 |
| 2016/0016315 A1* | 1/2016 | Kuffner, Jr. | B25J 9/1676 700/255 |
| 2016/0269640 A1* | 9/2016 | Watanabe | H04N 5/23267 |
| 2017/0038835 A1* | 2/2017 | Algotsson | G06F 3/005 |
| 2017/0146319 A1* | 5/2017 | Lyren | F41G 1/54 |
| 2017/0221272 A1* | 8/2017 | Li | G06T 19/006 |

OTHER PUBLICATIONS

Drummond et al., "Real-Time Visual Tracking of Complex Structures", IEEE Transactions on Pattern Analysis and Machine Intelligence, vol. 24, No. 7, pp. 932-946, Jul. 2002. Cited in specification.

Comport et al., "A Real-Time Tracker for Markerless Augmented Reality", Proc. The Second Int'l Symp. on Mixed and Augmented Reality (ISMAR03), pp. 36-45, Oct. 2003. Cited in specification.

Simon et al., "Markerless Tracking using Planar Structures in the Scene", Proc. Int'l Symp. on Augmented Reality 2000 (ISAR2000), pp. 120-128, 2000. Cited in specification.

Gordon et al., "Scene Modelling, Recognition and Tracking with Invariant Image Features", Proc. The Third Int'l Symp. on Mixed and Augmented Reality (ISMAR04), pp. 110-119, 2004. Cited in specification.

Hirokazu, "ARToolKit : Library for Vision-based Augmented Reality", Technology Research Report of the Institute of Electronics, Information and Communication Engineers, Japan, Institute of Electronics, Information and Communication Engineers, Feb. 14, 2002, Issue 101, No. 652, p. 79-86. Cited in specification. English translation provided.

Shoichi et al., "Restoration of Shift Variant Blurred Image Estimating the Parameter Distribution of PSF", Institute of Electronics, Information and Communication Engineers Academic Journal D vol. J77-D2 No. 4 pp. 719-728, 1994. Cited in specification. English translation provided.

Takayuki et al., "Rainfall Recognition for Various Conditions Using an In-vehicle Camera Image for Driver Assistance", DENSO Technical Review, vol. 12, No. 1, pp. 50-57, 2007. Cited in specification. English translation provided.

Extended European Search Report issued in European Appln. No. 17000349.5 dated Nov. 15, 2017.

Kurihata et al. "Rainy Weather Recognition from In-Vehicle Camera Images for Driver Assistance." Intelligent Vehicles Symposium, 2005: 205-210. Cited in NPL 1.

\* cited by examiner

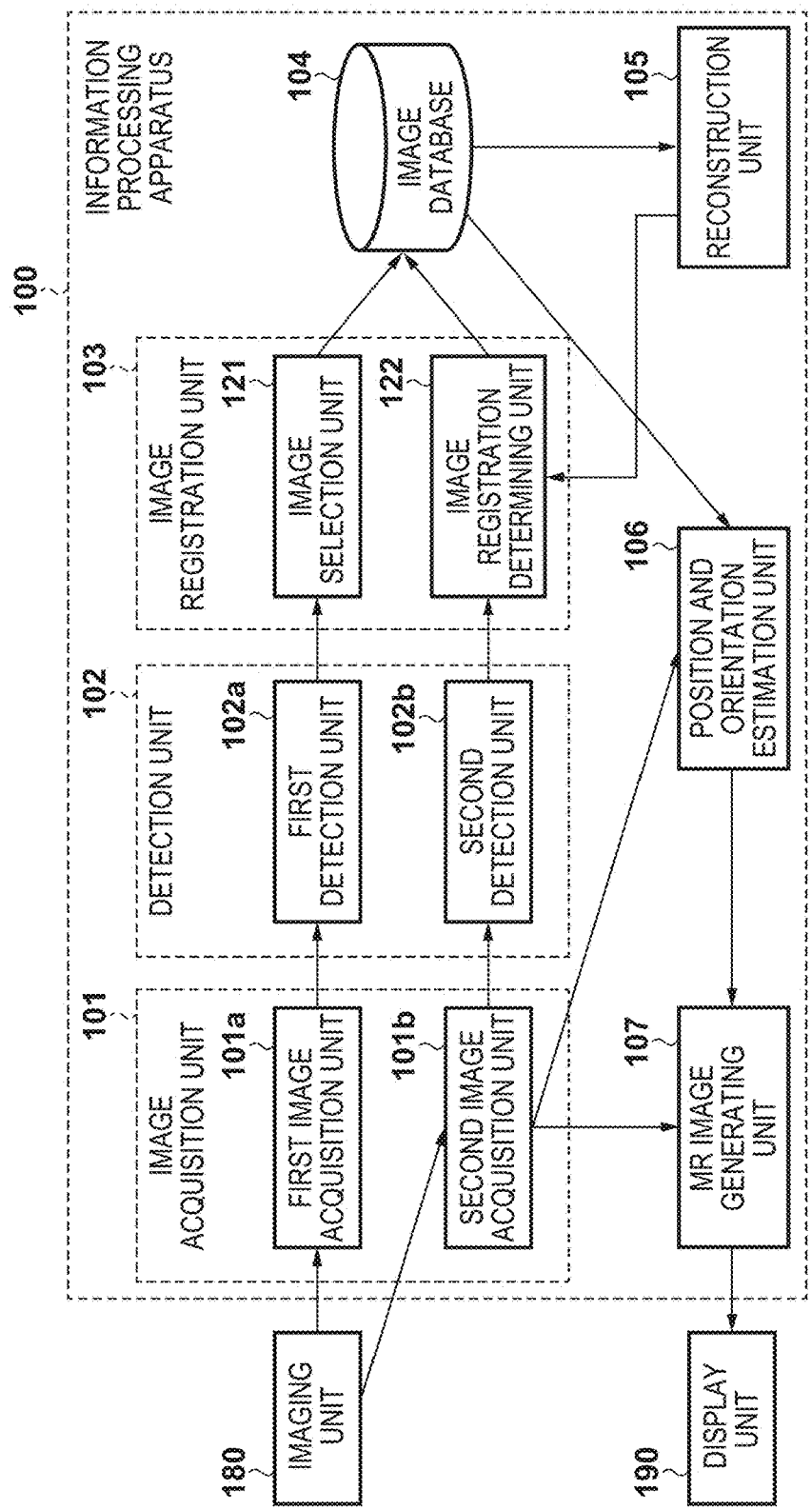

INITIALIZATION

MR APPLICATION OPERATION

INFORMATION PROCESSING APPARATUS AND METHOD OF CONTROLLING THE SAME

BACKGROUND OF THE INVENTION

Field of the Invention

The present invention relates to an information processing apparatus and a method of controlling the information processing apparatus which generate an image database for estimating a position and orientation of an imaging apparatus from a captured image.

Description of the Related Art

In recent years, research of mixed reality (hereinafter, referred to as MR) technologies in which a real space and a virtual space are caused to be blended without a sense of unnaturalness and presented is active. However, among MR technologies, augmented reality (hereinafter, referred to as AR) technologies in which a virtual space is overlaid on a real space and presented have been collecting interest. One of the important problems in the MR technologies and the AR technologies is how to perform alignment between the real space and the virtual space accurately in real time, and a great deal of effort has been put into this problem. The problem of alignment in MR and AR is a problem of obtaining the position and orientation of the imaging apparatus within the scene (specifically, in a reference coordinate system defined within the scene) in a video see-through method.

There is a method, as a representative example of a method in which alignment in a video see-through method is realized, in which a known artificial indicator of shape information is arranged in the scene, the indicator is imaged and recognized by an imaging apparatus, and the position and orientation of the imaging apparatus in the reference coordinate system are obtained thereby. The position and orientation of the imaging apparatus in the reference coordinate system is obtained from a correspondence between a projected position (image coordinate) of the indicator within the image that the imaging apparatus imaged and a three-dimensional coordinate in the reference coordinate system of the indicator which is known information.

Also, alignment in which characteristics (hereinafter referred to as natural features) originally existing within a scene are used without using an artificial indicator is actively being researched as a method of realizing alignment in the video see-through method. A method in which the position and orientation of an imaging apparatus are obtained based on a correspondence between an edge within an image and a three-dimensional model of an observation target is disclosed in "T. Drummond and R. Cipolla: "Real-time visual tracking of complex structures", IEEE Trans. on Pattern Analysis and Machine Intelligence, vol. 24, no. 7, pp. 932-946, 2002. (hereinafter referred to as D1)" and "A. I. Comport, E. Marchand, and F. Chaumette: "A real-time tracker for markerless augmented reality", Proc. The Second Int'l Symp. on Mixed and Augmented Reality (ISMAR03), pp. 36-45, 2003. (hereinafter referred to as D2)". Precision of the position and orientation of the imaging apparatus decreases when an incorrect detection occurs in a detection of an edge (corresponding point) corresponding to the three-dimensional model and precision of the alignment of MR and AR decreases. Accordingly, an M-estimator which is one robust estimation method is used and influence of the incorrect detection is eliminated by performing a weighted error minimization in D1 and D2.

Meanwhile, a method in which a point feature detected by a Harris operator, a Moravec operator, or the like, rather than an edge on the image, is used to obtain the position and orientation of an imaging apparatus is disclosed in "G. Simon, A. W. Fitzgibbon, and A. Zisserman: "Markerless tracking using planar structures in the scene", Proc. Int'l Symp. on Augmented Reality 2000 (ISAR2000), pp. 120-128, 2000. (hereinafter referred to as D3)" and "I. Gordon and D. G. Lowe: "Scene modelling, recognition and tracking with invariant features", Proc. The Third Int'l Symp. on Mixed and Augmented Reality (ISMAR04), pp. 110-119, 2004. (hereinafter referred to as D4)". A problem of an incorrect detection occurs even in a case when a point feature is used, similarly to a case when an edge is used. Accordingly, point features incorrectly detected are eliminated by a RANSAC (RANdom SAmple Concensus) algorithm in D3 and D4. In incorrect detection elimination using RANSAC, the position and orientation of an imaging apparatus are estimated by using corresponding points chosen randomly and a corresponding point that is not included in a set of corresponding points in a case when the number of corresponding points that agree with the estimated values is the greatest is eliminated as an incorrect detection.

The camera position and orientation estimation method recited in D1 through D4 are methods with a presupposition of an environment (hereinafter referred to as a stationary environment) in which a moving object is not captured in a camera image. In D1 through D3, estimation accuracy decreases in a case when a point being tracked moves within the actual environment because a camera position and orientation estimation is performed by corresponding point tracking between frames. Also, estimation accuracy decreases by the number of points that can be tracked decreasing by the points being tracked getting occluded by an object whose position and orientation changes along with a change in time (hereinafter referred to as a moving object) and by incorrect correspondence of the tracking increasing.

Also, in D4, a portion of an image group selected from a whole imaged image group is registered in an image database and an estimation of the camera position and orientation is performed by selecting from the image database and using an image in which an estimation error of the relative position and orientation with respect to the current image is the smallest. Here, cases in which a database is constructed in an environment in which people or cars pass through, water flows, or the like are considered. In such cases, because an image in which a moving object is captured is registered to the database, it ceases to be possible to correctly associate an object in the environment between the image registered in the image database and the current frame. For this reason, it is difficult to perform a camera position and orientation estimation that references an image database in a dynamic environment in which a moving object is captured in an image.

Meanwhile, conventionally, techniques for estimating a region of a moving object captured in an image by using image processing technology and an acceleration sensor or the like mounted to a camera are being developed. However, conventionally, a region of a moving object captured in an image cannot be used to determine whether to register a camera image to the database. Also, in a case when there is a function for measuring the position and orientation of the moving object, a region of a moving object in an image can be estimated by using a measurement result of the measurement function. However, conventionally, information of a region in which a moving object appears has not been used to determine whether to register a camera image to the database.

SUMMARY OF THE INVENTION

By virtue of the embodiment of the present invention, an information processing apparatus that improves the stability of estimation of the position and orientation of an imaging apparatus by preventing an unsuitable image from being referenced in the estimation of the position and orientation of the imaging apparatus, and a method of controlling the same are provided.

According to one aspect of the present invention, there is provided an information processing apparatus, comprising: an acquisition unit configured to acquire an image that is imaged by an imaging apparatus; a detecting unit configured to detect an occurrence of a factor that influences a position and orientation estimation relating to the image acquired by the acquisition unit; a determining unit configured to determine whether or not to register the image based on the factor detected by the detecting unit; and a constructing unit configured to construct an image database for estimating the position and orientation of the imaging apparatus from the image acquired by the acquisition unit using a group of images determined to be registered by the determining unit.

According to another aspect of the present invention, there is provided an information processing apparatus, comprising: an acquisition unit configured to acquire a camera image that is imaged by an imaging apparatus; a detecting unit configured to detect a region that adversely influences a position and orientation estimation in the camera image; a constructing unit configured to construct an image database used to estimate the position and orientation of the imaging apparatus from a camera image using a group of camera images acquired by the acquisition unit, wherein the constructing unit reconstructs a three-dimensional structure of an actual environment using the parts of the group of camera images registered in the image database except for the region detected by the detecting unit, and stores each camera image of the group of camera images in association with three-dimensional information based on the three-dimensional structure.

According to another aspect of the present invention, there is provided a method of controlling an information processing apparatus, the method comprising: acquiring an image that is imaged by an imaging apparatus; detecting an occurrence of a factor that influences a position and orientation estimation relating to the acquired image; determining whether or not to register the image based on the detected factor; and constructing an image database for estimating the position and orientation of the imaging apparatus from the acquired image using a group of images determined to be registered.

According to another aspect of the present invention, there is provided a method of controlling an information processing apparatus, the method comprising: acquiring a camera image that is imaged by an imaging apparatus; detecting a region that adversely influences a position and orientation estimation in the camera image; constructing an image database used to estimate the position and orientation of the imaging apparatus from a camera image using an acquired group of camera images, wherein in the construction of the image database, a three-dimensional structure of an actual environment is reconstructed using the parts of the group of camera images registered in the image database except for the region that adversely influences a position and orientation estimation, and stores each camera image of the group of camera images in association with three-dimensional information based on the three-dimensional structure.

Further features of the present invention will become apparent from the following description of exemplary embodiments (with reference to the attached drawings).

BRIEF DESCRIPTION OF THE DRAWINGS

FIG. 1 is a block diagram illustrating an example of a configuration of an information processing apparatus 100 according to a first embodiment.

DESCRIPTION OF THE EMBODIMENTS

Figure 2A:
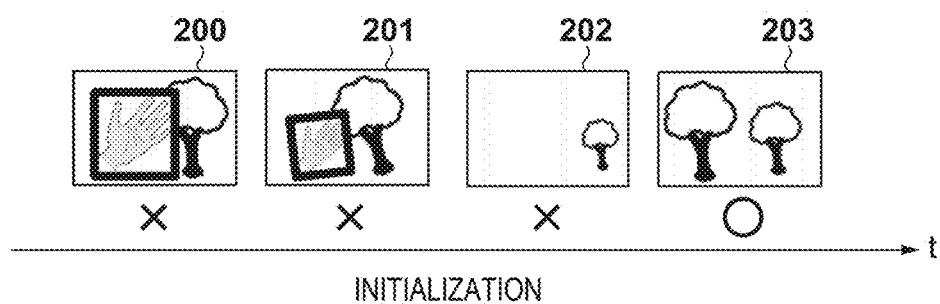
FIGS. 2A through 2B are views describing a registration determination according to a first embodiment.

Below, several descriptions are given in detail of a preferred embodiment of the present invention, with reference to the attached drawings.

First Embodiment

FIG. 1 is a block diagram illustrating an example of a configuration of an information processing apparatus 100 according to a first embodiment. The information processing apparatus 100 has an image acquisition unit 101, a detection unit 102, an image registration unit 103, an image database 104, a reconstruction unit 105, a position and orientation estimation unit 106, and an MR image generating unit 107. An observer holds an imaging unit 180 and an actual environment appears on an image (camera image) acquired by the imaging unit 180.

The information processing apparatus 100 of the first embodiment uses an image (camera image) imaged by the imaging unit 180 (camera) to generate the image database 104 for estimating the position and orientation of the imaging unit 180. Firstly, in the generation of the image database 104, the detection unit 102 detects an occurrence of a factor that influences a position and orientation estimation for an image (camera image) acquired by the image acquisition unit 101. The detection unit 102 of the present embodiment detects a region of a predetermined moving object (a region of the hand of a person for example) existing in the acquired image as the foregoing factor described. The image registration unit 103 determines whether or not to register the inputted camera image in the image database 104 based on the factor detection result by the detection unit 102. By this, a registration of a camera image that is unsuitable for the estimation of the position and orientation is avoided, and the image database 104 is generated with camera images that are suitable for the estimation of the position and orientation.

Also, in the generation of an MR image, the position and orientation estimation unit 106 estimates the position and orientation of the imaging unit 180 in relation to the actual environment from camera images inputted in sequence by referencing the image database 104. The MR image generating unit 107 generates the MR image based on the camera image and the position and orientation of the imaging unit 180 estimated by the position and orientation estimation unit 106.

Note, in the first embodiment, it is assumed that an alignment method that uses a projection of a three-dimensional distribution of luminance gradients estimated by stereoscopic image processing is used. Also, in the first embodiment, a hand of a person is detected as the predetermined moving object described above. Specifically, the detection unit 102 detects a hand (of an observer) captured as the moving object in the camera image acquired from the imaging unit 180 that the observer holds. Note, although the hand of the observer is used as the moving object in the first embodiment, limitation is not made to this. For example, the leg or foot of a person, an electronic device cable, another person present in the periphery, and the like may also be detected as the predetermined moving object. Alternatively, in addition to or instead of detecting an object decided beforehand as a moving object, an object that is actually moving may be detected from the camera images inputted in sequence as a moving image, and that may be used as the moving object.

The image acquisition unit 101 is realized by a video capture board, an IEEE 1394 interface board, a USB port, or the like for example and acquires a camera image from the imaging unit 180. In the image acquisition unit 101, a first image acquisition unit 101a acquires a camera image for initialization for the image database 104 and a second image acquisition unit 101b acquires a camera image for use by an MR application from the imaging unit 180. Note, the camera image for initialization is a captured image for which the position and orientation of the imaging unit 180 that imaged the image is known, and may be acquired from the imaging unit 180 or may be acquired from a storage apparatus (not shown) that stores this kind of captured image. Also, although the first image acquisition unit 101a and the second image acquisition unit 101b are illustrated separately as two blocks from the perspective on a functional configuration, it is not necessary that separate hardware be used to realize these functions.

The detection unit 102 detects a moving object from a camera image that the image acquisition unit 101 acquired and supplies a detection result to the image registration unit 103. The first detection unit 102a detects the region of the moving object (hereinafter referred to as the moving object region) in the camera image that the first image acquisition unit 101a acquired, and the second detection unit 102b detects the moving object region in the camera image that the second image acquisition unit 101b acquired. Also, although the first detection unit 102a and the second detection unit 102b are illustrated separately as two blocks from the perspective on a functional configuration, it is not necessary that separate hardware be used to realize these functions.

The image registration unit 103 includes an image selection unit 121 and a registration determination unit 122. The image selection unit 121 selects from the camera images acquired by the first image acquisition unit 101a (selection determination) a camera image for initialization based on the moving object region detection result by the first detection unit 102a. The selected camera image for initialization is registered to the image database 104. The registration determination unit 122 determines (registration determination) whether or not to register camera images inputted in succession from the image acquisition unit 101 while the MR application is being executed to the image database 104 based on the moving object region detection result by the second detection unit 102b. A camera image for which registration is determined is registered to the image database 104. Also, the image selection unit 121 and the registration determination unit 122 are illustrated separately as two blocks from the perspective on a functional configuration, but it is not necessary that separate hardware be used to realize these functions. The imaging unit 180 is connected to the first image acquisition unit 101a and the second image acquisition unit 101b. A display unit 190 is connected to the MR image generating unit 107.

A more detailed description is given regarding the foregoing configuration. The observer holds the imaging unit 180, an actual environment is captured in the camera image acquired from the imaging unit 180, and the hand of the observer is captured in some cases. The camera images that the first image acquisition unit 101a and the second image acquisition unit 101b acquired are inputted to the first detection unit 102a and the second detection unit 102b respectively. The first detection unit 102a and the second detection unit 102b detect the moving object region from the inputted camera images.

The first detection unit 102a and the second detection unit 102b detect, as the moving object region, the region of a specific object that could move that is captured in the camera image. In the present embodiment, a "hand" is detected as the specific object. It is assumed that the hand of the observer is in the front of an object of the actual environment. Note, in the present embodiment, it is assumed that the region of the hand is detected based on a definition of hand color set in advance in the storage unit (not shown). For example, it is possible to image the hand of the observer in advance, set a color region representing the color of the hand, and then estimate the region of the hand by threshold processing on the pixels in the camera image. Of course, the method of acquiring the region of the hand is not limited to this, and any publicly known method can be used such as estimating by an ellipse fitting based on information of a position sensor attached to a wrist or a finger.

The image selection unit 121 selects (selection determination) a camera image for initialization to register to the image database 104 based on the moving object region that the first detection unit 102a detected from the initial camera image group acquired by the first image acquisition unit 101a. Note, in the present embodiment, the moving object region is a region of a captured hand (of the observer). The selected camera image for initialization may be one image or may be plurality of images. In the present embodiment, it is assumed that one camera image for initialization is selected (an example in which a plurality of camera images for initialization selected is described in the second embodiment). The registration determination unit 122 performs a determination (registration determination) of whether or not to register camera images that the second image acquisition unit 101b acquired in sequence to the image database 104 based on the moving object region that the second detection unit 102b detected after registration of the camera image for initialization.

Note, in the present embodiment, the size of the moving object region detected from the camera image is considered as a determination condition for the selection determination of the image selection unit 121 and the registration determination of the registration determination unit 122. Furthermore, luminance gradients in the camera image are also used as a determination condition for the selection determination and the registration determination. Accordingly, the first detection unit 102a and the second detection unit 102b of the present embodiment also detect the luminance gradients from the camera image.

The reconstruction unit 105 integrates a group of camera images held in the image database 104, estimates a three-dimensional structure of the actual environment, and generates three-dimensional structure data by a reconstruction. Three-dimensional structure data is data of a group of points which holds coordinate positions of points and colors of points. Here, the coordinate positions of points are three-dimensional coordinate values for which a particular position and orientation in the actual environment are defined as a reference for the coordinate system. The estimation of a three-dimensional structure is realized by a method of integrating and processing camera images held in the image database 104 to construct a single three-dimensional model such as SfM (Structure from Motion) for example. The camera image group with which the three-dimensional information (three-dimensional structure data) generated by the reconstruction unit 105 is associated is stored as a registered image group in the image database 104. In this way, position and orientation information of the imaging unit 180 (also called imaging position and orientation) is associated with each camera image of the registered image group of the image database 104.

The position and orientation estimation unit 106 compares the camera images acquired by the second image acquisition unit 101b with the registered image group stored in the image database 104 and estimates the imaging position and orientation of the imaging unit 180. The estimation of the imaging position and orientation is performed by matching between images based the position/orientation information of images having the highest level of similarity.

The MR image generating unit 107 generates MR images by rendering virtual object data based on an estimated value of the imaging position and orientation of the imaging unit 180 acquired by the position and orientation estimation unit 106 onto the camera images acquired in sequence by the second image acquisition unit 101b. The generated MR images are transmitted to the display unit 190 and displayed. The display unit 190 is configured by a head mounted display, a head-up display, a mobile display, or the like and presents the MR image that the MR image generating unit 107 generated to the observer.

Figure 2B:
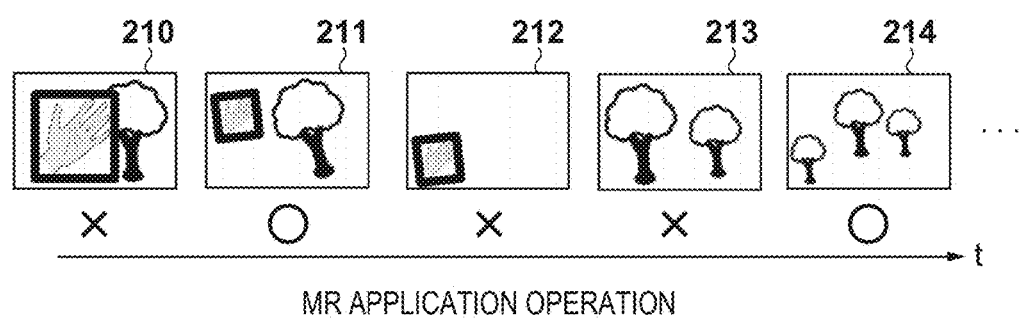
Figure 3:
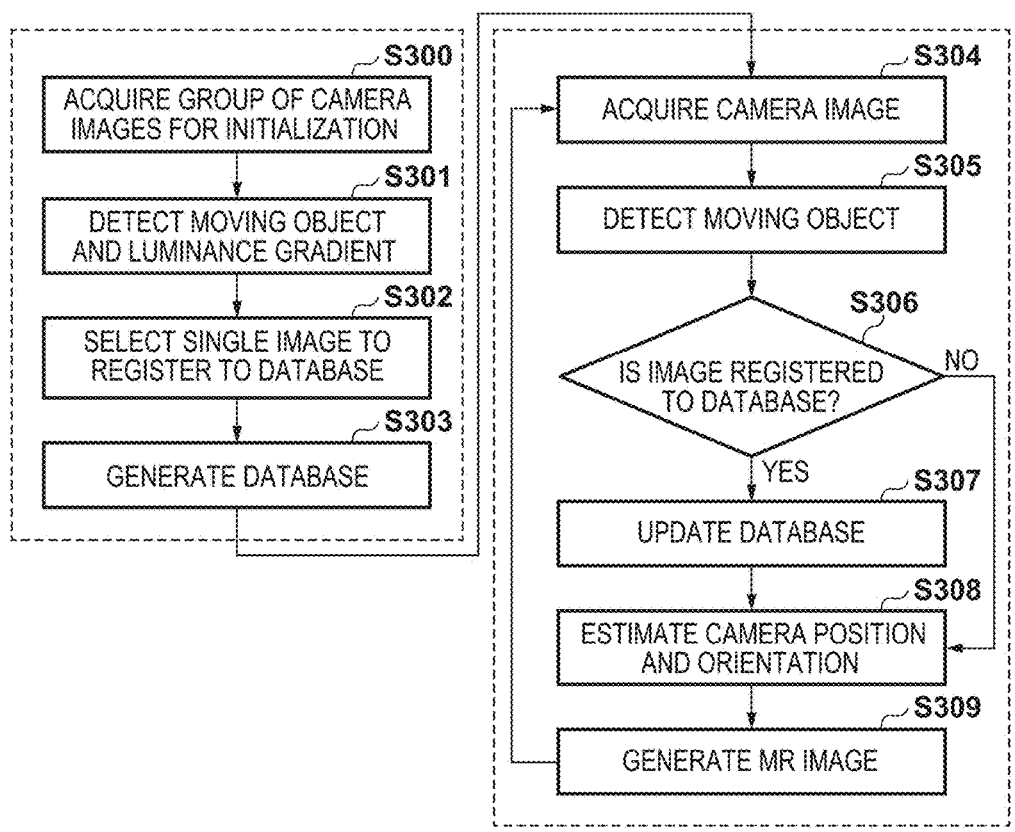
FIG. 3 is a flowchart illustrating a processing procedure of a position and orientation measurement method according to a first embodiment.

Next, MR image generation processing in the first embodiment is described. FIGS. 2A and 2B are views for describing the selection of the initial image and the registration of camera images that the image registration unit 103 performs. FIG. 3 is a flowchart illustrating an MR image generation processing procedure in the first embodiment. Step S300 through step S303 are initialization operations by the image selection unit 121 mainly. Step S304 through step S309 are processes for registration (updating the image database 104) of a camera image and generation of an MR image which are executed during operation of the MR application. The processing of step S304 through step S309 is repeatedly executed on the camera images (video) inputted in sequence from the imaging unit 180. Hereinafter, description is given regarding a processing procedure of MR image generation using FIG. 1, FIGS. 2A and 2B, and FIG. 3 in the first embodiment.

In step S300, the first image acquisition unit 101a acquires a group of camera images for initialization. Next, in step S301, the first detection unit 102a performs a detection of a moving object region and luminance gradients for each camera image of the camera image group acquired in step S300. The first detection unit 102a detects the region of the hand of the observer from each image of the camera image group for initialization as a moving object region because the moving object in the first embodiment is the hand of the observer. In step S302, the image selection unit 121 selects a single image to register in the image database 104 from the camera image group for initialization acquired in step S300 as a camera image for initialization based on the moving object region and the luminance gradients detected in step S301. In the present embodiment, the image selection unit 121 selects one image in which there is no hand (of the observer) region within the image and in which the number of luminance gradients is greater than or equal to a fixed number.

FIG. 2A is an example of a situation in which a single image to be registered in the database at a time of initialization is selected in the present embodiment. A camera image 200 and a camera image 201 are not selected as the single image because it is determined that a hand is captured in them (a moving object region exists). A camera image 202 is not selected as the single image due to the number of the detected luminance gradients being small even though the region of the hand is not detected in it. A camera image 203 is selected as the single image because there is no region of the hand of the observer and the number of luminance gradients included therein are greater than or equal to the fixed number. In this way, the processing advances to step S303 when the selection of the single image ends. In step S303, the image registration unit 103 generates the image database 104 by using the single image selected in step S302. More specifically, the image registration unit 103 registers the single image to the image database and registers the imaging position and orientation of the registered single image as a reference position and orientation.

The processing advances to step S304 when the initialization processing of step S300 through step S303 ends as described above. In step S304 through step S309, the image database 104 is updated by using the camera images (each frame of the moving image in the present embodiment) acquired in sequence from the imaging unit 180, the position and orientation of the imaging unit 180 relating to each acquired camera image is acquired, and an MR image is generated.

Firstly, in step S304, the second image acquisition unit 101b acquires a camera image from the imaging unit 180. Next, in step S305, the second detection unit 102b performs a detection of a moving object region (a region of a hand in the present embodiment) and luminance gradients for each camera image acquired in step S304. Also, in step S306, the registration determination unit 122 determines whether or not the camera image acquired in step S304 is registered to the image database 104. The processing advances to step S307 in a case when it is determined that the image is registered and the processing advances to step S308 in a case when it is determined that the image is not registered.

In the registration determination of step S306, it is determined that the camera image is to be registered to the image database 104 in a case when a hand region is not detected in step S305 and the number of luminance gradients included therein is greater than or equal to the fixed number. Of course, the condition for registration determination is not limited to this. For example, configuration may be taken such that an image for which the percentage with respect to the whole image of the size of the region of the hand estimated in the camera image is less than a fixed value and for which the number of luminance gradients included is greater than or equal to the fixed number is registered to the image database 104. Note, information indicating whether or not each pixel of a camera image is the region of the hand is added in a case when a camera image that includes a hand region is registered. Also, configuration may be taken such that information of the probability that each pixel is in a hand region is added to the camera image.

Additionally, the number of images of the database becomes huge when images that have a high level of similarity with the image that is registered (an image selected in step S302) at the time of initialization are registered. Accordingly, configuration may be taken such that images (images exceeding a level of similarity of a predetermined threshold) that have a very high level of similarity are not registered.

FIG. 2B is a view for describing an example of a registration determination of whether or not to register a camera image to the image database 104 in the present embodiment. A camera image 210 is not registered because the detected region of the hand is large. A camera image 211 is registered because the region of the hand is small and the number of luminance gradients is greater than or equal to the fixed number. A camera image 212 is not registered because even though the region of the hand is small, the number of luminance gradients is less than the fixed number. A camera image 213 is not registered because the level of similarity with the camera image 203 (FIG. 2A) registered at a time of initialization is greater than or equal to the threshold. A camera image 214 is registered because there is no hand region and the number of luminance gradients is greater than or equal to the fixed number. In this way, the determination condition for the selection determination of the image selection unit 121 and the determination condition for the registration determination of the registration determination unit 122 are different from each other, and an image that is suitable as the camera image for initialization and an image that is suitable for updating the image database are selected and registered.

In step S307, the image registration unit 103 registers the camera image acquired in step S304 to the image database 104 and updates the image database 104 by using the reconstruction unit 105. In the update of the image database 104, firstly, the reconstruction unit 105 makes the imaging position and orientation of the image registered (image registered in step S303) by the initialization processing a reference and estimates the imaging position and orientation of other registered images in the image database 104. Next, a registration of the imaging position and orientation of each image is performed for the other registered images. An imaging position and orientation optimization calculation of an image in an image group within the database is performed by an SfM method and the imaging position and orientation of other registered images is estimated for example, in the method of estimating the imaging position and orientation of other registered images.

Next, in step S308, the position and orientation estimation unit 106 estimates the camera position and orientation from the camera image acquired in step S304. The method of estimating of the camera position and orientation is as follows for example. Firstly, the position and orientation estimation unit 106 selects one image having the highest level of similarity with the camera image of the current frame from the registered image group of the image database 104. Next, the position and orientation estimation unit 106 performs an association of image features between the two images of the camera image of the current frame and the registered image selected from the image database 104 (the registered image that has the highest level of similarity to the current frame), and estimates a relative position and orientation change amount between the two. Also, the position and orientation estimation unit 106 estimates the position and orientation of the imaging unit 180 (the camera position and orientation) based on the estimated change amount of the relative position and orientation and the imaging position and orientation registered for the selected image.

However, an estimation error becomes large when image features extracted from the region of a moving object is associated in the association of image features between the current frame and the selected image. For this reason, the association of the image features is performed using a region other than the moving object region. In the present embodiment, a change amount of the relative position and orientation between the current frame and the selected image is estimated by the association between image features extracted in an image region other than a hand region because the moving object is the hand of the observer. Note, in a case when information of the probability that each pixel is a hand region is added, the probability information is introduced into the level of similarity calculation and the evaluation of the association of image features is performed by a weighted calculation using the probability. In this way, a value indicating the probability that a respective pixel of an image registered to the database is the moving object is set, and the stability of the alignment can be improved by using that.

In step S309, the MR image generating unit 107 generates an MR image by combining a virtual object with the camera image (the current frame) based on the estimated value of the camera position and orientation acquired in step S308.

As described above, in the first embodiment, a region in which a moving object exists on an image is detected and a determination as to whether to register the image is performed based on the percentage of the image that the moving object region covers. By this, it is possible to generate a high precision image database and perform a high precision and stable camera position and orientation estimation even if a moving object exists in a camera image acquired by the imaging unit 180. Specifically, by virtue of the first embodiment, it is possible to generate a high precision image database and it is possible to perform a high precision and stable estimation of a camera position and orientation by performing the determination as to whether to register an image based on image processing results.

Note, in the embodiment described above, although a moving object region and a luminance gradient are used, a number of features included in a camera image may be used instead of or in addition to the luminance gradient. For example, the detection unit 102 may also perform a detection of feature points from a camera image and the image registration unit 103 may use the fact that the number of feature points is detected to be greater than or equal to a threshold as one of the determination conditions of the selection determination or the registration determination. Note, in the detection of the feature points, although an image filter such as a Harris operator can be used, the detection method of the feature points is not limited to this. For example, it may be any publicly known method such as a method in which a mark (such as a colored ball for example) artificially positioned in the environment is detected based on color information. Also, an association of feature points between a camera image registered to the image database 104 and a camera image of a determination target is performed and acquisition of greater than or equal to a fixed number of pairs of corresponding points may be made to be the condition for registration determination.

Second Embodiment

In the second embodiment, description is given regarding a case in which an initialization of an image database in which an object (a known shape object) whose shape is known beforehand is used as an object for initialization and an alignment method that uses a projection of a three-dimensional distribution of luminance gradients estimated by stereoscopic image processing are employed. In the second embodiment, similarly to the first embodiment, description is given regarding a position and orientation measurement method for obtaining the position and orientation in the actual environment of the camera in a case when the hand of the observer is captured in a camera image acquired from the imaging unit 180 that the observer holds.

The configuration of the information processing apparatus 100 of the present embodiment is described re-using the block diagram of FIG. 1 because it is similar to the first embodiment (FIG. 1). Hereinafter, description is given regarding mainly portions of the second embodiment that are different from the first embodiment.

The observer holds the imaging unit 180 and the first image acquisition unit 101a acquires a group of camera images for initialization from the imaging unit 180. An image in which the hand of the observer is captured as a moving object and an image in which a known shape object is captured are included in the group of camera images. In the information processing apparatus 100, the first detection unit 102a detects the moving object region (region of the hand) and the known shape object region in respective camera images of the camera image group for initialization that the first image acquisition unit 101a acquired. The method of acquiring the region of the hand is the same as in the first embodiment. Also, in the present embodiment, the known shape object is a two-dimensional planar marker and is detected based on a definition of a shape set in advance in the storage unit (not shown). For example, the detection unit 102 can estimate the region of the known shape object from each camera image of the camera image group for initialization by using a conventional marker detection method (for example, the method recited in "Kato Hirokazu: "ARToolKit: Library for Vision-based Augmented Reality", Technology Research Report of the Institute of Electronics, Information and Communication Engineers, Japan, Institute of Electronics, Information and Communication Engineers, Feb. 14, 2002, Issue 101, Number 652, p. 79-86 (hereinafter referred to as D5)".

The image selection unit 121 selects the camera image for initialization to register to the image database 104 based on the detection result of the first detection unit 102a. Specifically, the image selection unit 121 selects one or a plurality of camera images to register to the image database 104 based on a moving object region (a region in which the hand is captured) and a distribution of regions of the known shape object from a plurality of camera images. Note, in the present embodiment, it is assumed that the hand of the observer is an object of the actual environment and is in front of the known shape object.

In the MR application, the second detection unit 102b detects the moving object region and the luminance gradients within the camera image from the camera image that the second image acquisition unit 101b acquired. The registration determination unit 122 performs a determination (reg- istration determination) of whether or not to register the camera image to the image database 104 based on the detection result of the moving object region and the luminance gradients by the second detection unit 102b. As described above, in the image selection unit 121, it is determined whether or not to select the camera image as an initial image of the image database 104 based on the distribution of the moving object region (region in which the hand is captured) and the known shape object region. For example, in the image selection unit 121, the size of the moving object region being less than or equal to a predetermined value and the region of the known shape object being greater than or equal to the predetermined value is included in the determination condition of the selection determination. Meanwhile, in the registration determination unit 122, although the moving object region is included in the determination condition of the registration determination, the size of the region of the known shape object is not included in the determination condition.

Figure 4:
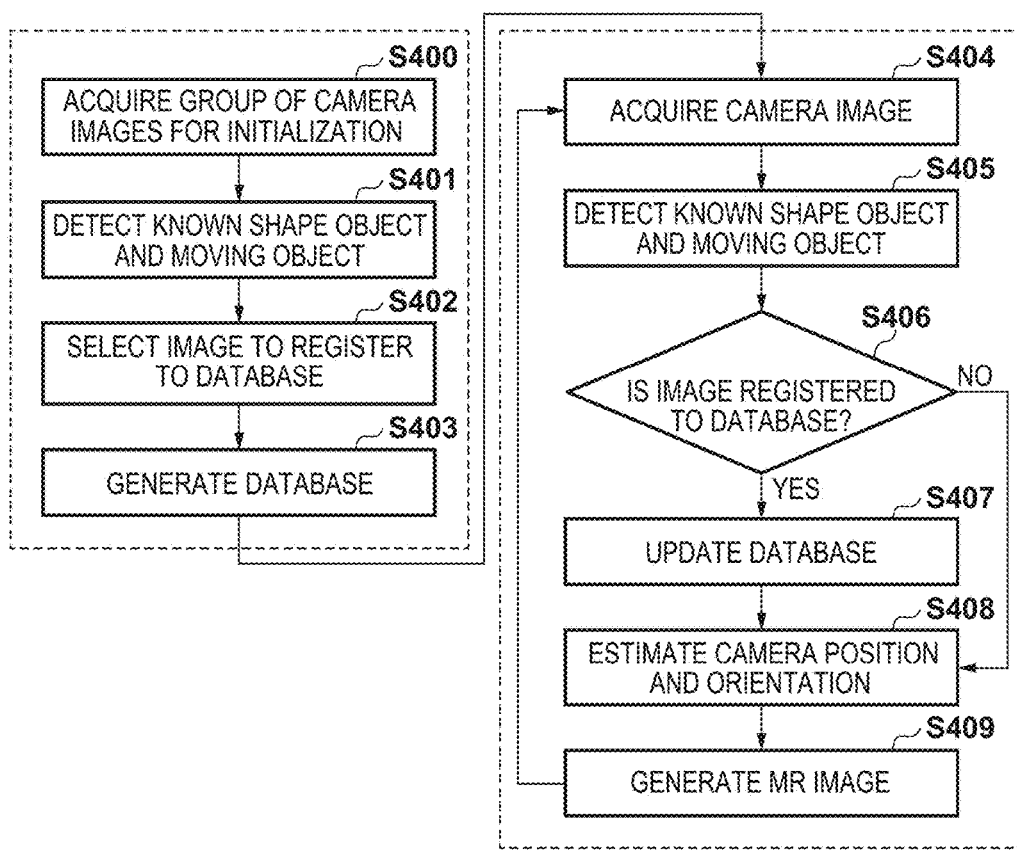
FIG. 4 is a flowchart illustrating a processing procedure of a position and orientation measurement method according to a second embodiment.

Next, MR image generation processing procedure according to a second embodiment is described. FIG. 4 is a flowchart illustrating MR image generation processing procedure according to the second embodiment. Step S400 through step S403 are initialization operations by the image selection unit 121 mainly. Step S404 through step S409 are processes for registration (updating the image database 104) of a camera image and generation of an MR image which are executed during operation of the MR application. The processing of step S404 through step S409 is repeatedly executed on the camera images (video) inputted in sequence from the imaging unit 180. Also, FIGS. 5A-5D are views for describing the selection determination of the image selection unit 121 and the registration determination of the registration determination unit 122 according to a second embodiment.

In step S400, the first image acquisition unit 101a acquires a group of camera images for initialization. Next, in step S401, the first detection unit 102a performs a detection of the known shape object region and the moving object region in the camera image. The first detection unit 102a detects a region of a hand of the observer in each camera image of the camera image group for initialization acquired by the first image acquisition unit 101a because the moving object in the present embodiment is the hand of the observer.

In step S402, the image selection unit 121 selects the camera image for initialization registered to the image database 104 from the camera image group for initialization. Here, a reference of the selection determination is set based on the detection result of the region of the known shape object and the region of the moving object. For example, the moving object region being less than or equal to a fixed size, and an overlap area of the known shape object region and the moving object region being less than or equal to a fixed value are made to be the conditions of the selection determination. Note, in step S402, one or a plurality of camera images are selected as the camera images for initialization.

Figure 5A:
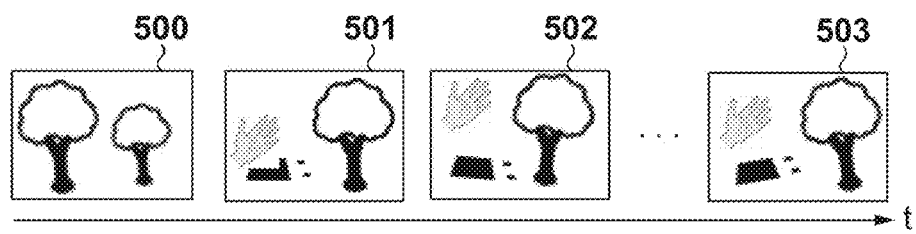
FIGS. 5A through 5D are views describing a registration determination according to the second embodiment.
Figure 5B:
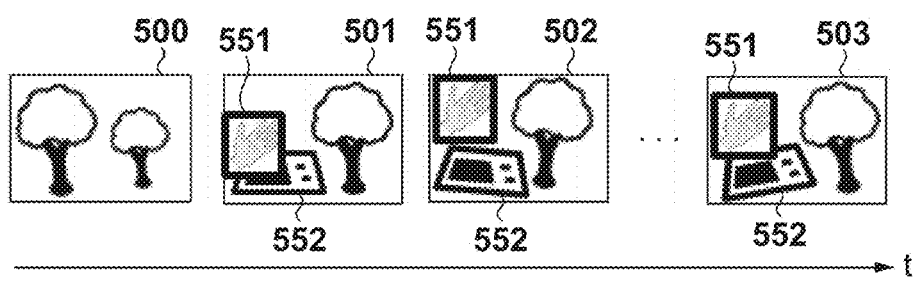
Figure 5C:
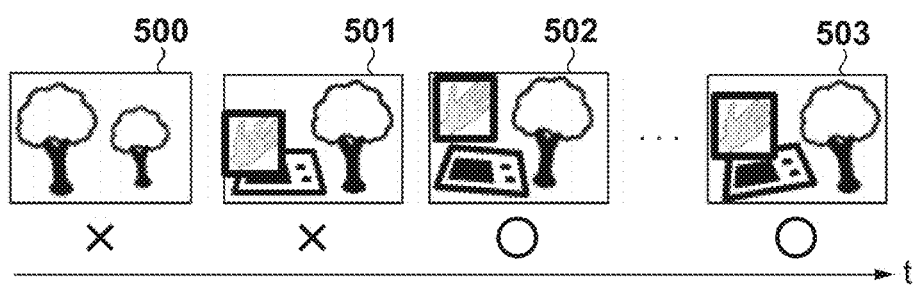

FIG. 5A, FIG. 5B, and FIG. 5C are views for describing a determination for selection of a camera image for initialization in the second embodiment. Camera images 500, 501, 502, and 503 illustrated in FIG. 5A are the camera image group for initialization acquired by the first image acquisition unit 101a. FIG. 5B is a result in which the region of the moving object (the region of the hand) and the region of the known shape object are detected from the camera images 500, 501, 502, and 503 illustrated in FIG. 5A. In the example of the figure, a region 551 of the hand and a region 552 of the known shape object are detected in the camera images

501, 502, and 503. FIG. 5C is a result in which a selection determination regarding the camera images 500, 501, 502, and 503 illustrated in FIG. 5A is performed. In the present example, the camera image 500 is not selected as a camera image for initialization because the known shape object is not detected. The camera image 501 is not selected as the camera image for initialization because the overlap area between the known shape object and the region of the hand is greater than or equal to a fixed value. The camera image 502 and the camera image 503 are selected as camera images for initialization. The processing advances to step S403 when the selection of the camera images for initialization to be registered in the image database 104 ends.

In step S403, the image registration unit 103 generates the image database 104 by using the camera images for initialization that the image selection unit 121 selected in step S402. Specifically, the image registration unit 103 registers the camera images for initialization selected in step S402 to the image database 104 and registers an imaging position and orientation of the registered camera images for initialization as a reference position and orientation. Here, an imaging position and orientation of an images is registered as a reference position and orientation in a case when there is one registered camera image for initialization. Also, in a case when there are two or more registered camera images for initialization, one image from these images is selected and registered as the reference position and orientation. As a method for selecting one camera image from a plurality of camera images for initialization there is a method of selecting an image in which a known shape object appears largest, for example. Of course, a condition, such as luminance gradients, that is not used in step S402 may be used. The processing advances to step S404 when the image database 104 is generated.

Figure 5D:
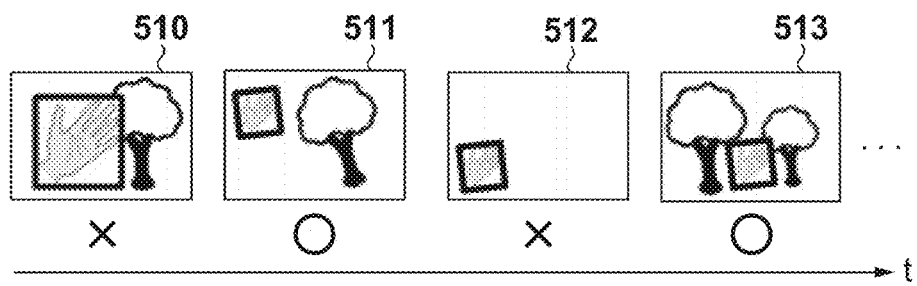

In step S404, the second image acquisition unit 101b acquires a camera image from the imaging unit 180. Next, in step S405, the second detection unit 102b detects the moving object region (hand region in the present embodiment) from the camera image that the second image acquisition unit 101b acquired. Also, in step S406, the registration determination unit 122 makes the registration determination as to whether or not to register the camera image acquired in step S404 to the image database 104. The registration determination is performed based on the moving object region and luminance gradient detection results by the second detection unit 102b for example. For example, the moving object region being less than or equal to a fixed amount and the number of the luminance gradient being greater than or equal to a fixed value can be given as determination conditions of the registration determination. FIG. 5D is a view illustrating an example of the registration determination in the second embodiment. In this example, a camera image 510 is not registered because the moving object region is larger than the fixed amount. A camera image 511 is registered because the moving object region is less than or equal to the fixed amount and the number of the luminance gradient is greater than or equal to the fixed value. A camera image 512 is not registered because the moving object region is less than or equal to the fixed amount and the number of the luminance gradient is less than the fixed value. A camera image 513 is registered because the moving object region is less than or equal to the fixed amount and the number of the luminance gradient is greater than or equal to the fixed value. In the case of the present example, the existence or absence of a known shape object is not included in the determination conditions of the registration determination.

As described above, in the second embodiment, a high precision image database can be generated by detecting a known shape object for initialization and a region in which a moving object exists on an image and performing an image registration determination based on these detection results. Additionally, as a result of this, a high precision and stable camera position and orientation estimation can be performed.

As described above, by virtue of the first and second embodiments, a database registration of captured camera images for which a moving object is large is prevented and stability of a camera position and orientation estimation improves by calculating the percentage of the moving object region in the camera image and performing a camera image registration determination. Also, the precision of a relative position and orientation calculation between camera images can be improved and calculation time can be shortened. Also, in a case when a configuration (a position sensor attached to a wrist or a finger) in which the position and orientation of the moving object is measured, it is possible to prevent registration to the image database 104 of captured camera images in which a moving object is large by using information acquired from this configuration. As a result, stability of the camera position and orientation estimation can be improved.

<First Variation>

In the first embodiment and the second embodiment, determination conditions of the selection determination and the registration determination in the image registration unit 103 consider a moving object region (a region in which a moving object is captured). However, from considering factors that adversely influence the construction of the image database 104, the determination condition is not limited to this and other useful criteria exist.

Figure 6A:
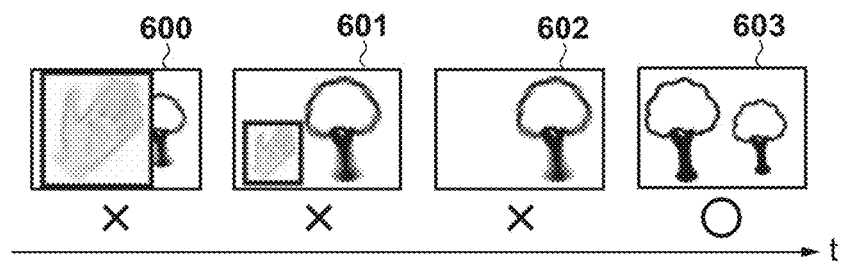
FIGS. 6A through 6B are views describing a registration determination according to a variation.
Figure 6B:
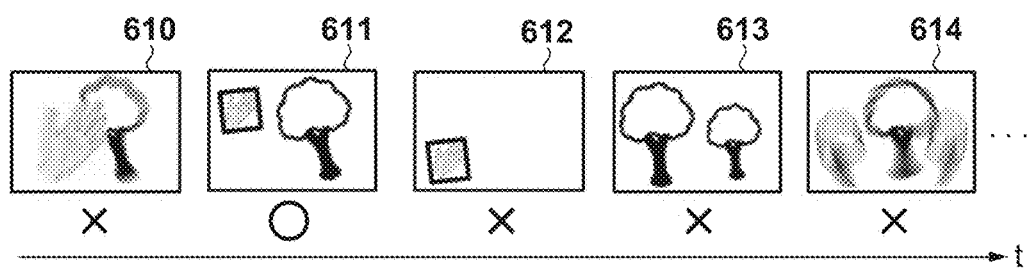

For example, configuration may be taken such that an image registration determination is performed based on a result of an estimation of a blur amount of an image (blur amount estimation) as illustrated in FIGS. 6A and 6B. By virtue of this configuration, it is possible to appropriately construct the image database and stabilize/improve precision of the camera position and orientation estimation even in a cases such as when blurring occurs in the camera image at a time of initialization and at a time of an operation of the MR application. In such cases, a size of the blur amount acquired as a result of a blur amount estimation being less than or equal to a threshold can be included for example, as one condition of the selection determination and the registration determination. Note, a known method can be used for the blur amount estimation, such as the method recited in "Hashimoto Shoichi, Saito Hideo: "Restoration of Shift Variant Blurred Image Estimating the Parameter Distribution of PSF", Institute of Electronics, Information and Communication Engineers Academic Journal D Vol. J77—D2 No. 4 pp. 719-728, 1994. (hereinafter referred to as D6)" for example. Also, configuration may be taken such that an estimation of a blur amount is performed in the detection unit 102 for example.

Note, there is a motion blur occurring due to movement of the camera, a defocus blur occurring by a shift of focus of the camera, or the like as types of blurring detected by the image processing of the camera image. Additionally, it is possible to envision that the speed of the physical motion of the camera is proportional to the blur amount and to use a blur amount estimation based on a signal of an acceleration sensor or an angular velocity sensor.

FIG. 6A is a view for describing the selection determination of a camera image for initialization performed in the image selection unit 121. Also, FIG. 6B is a view for describing the registration determination of a camera image performed in the registration determination unit 122. In FIG. 6A, camera images 600, 601, and 602 are not selected as a camera image for initialization because the estimated blur amount is greater than or equal to a fixed value or the moving object region is greater than or equal to a fixed amount. A camera image 603 is selected as the camera image for initialization and registered to the image database 104 because the estimated blur amount is less than the fixed value and the moving object region is also not detected. FIG. 6B is an example of a registration determination in a case when the moving object region (hand region) being less than or equal to a fixed amount, the blur amount being less than a fixed value, and the number of luminance gradients being greater than or equal to a fixed value are made to be criteria. Only a camera image 611 which satisfies all of these conditions is registered to the image database 104 and camera images 610, 612, 613, and 614 are not registered.

Figure 7A:
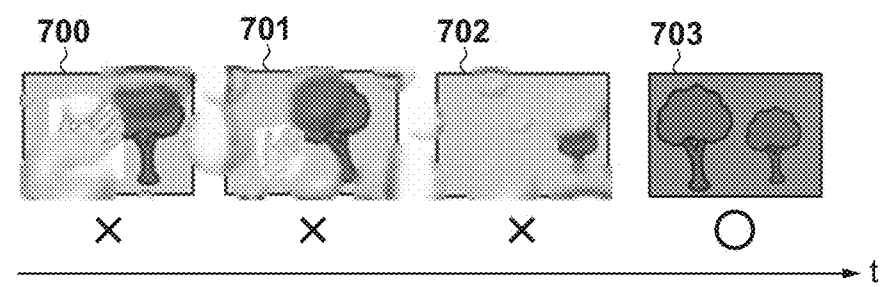
FIGS. 7A through 7B are views describing a registration determination according to a variation.
Figure 7B:
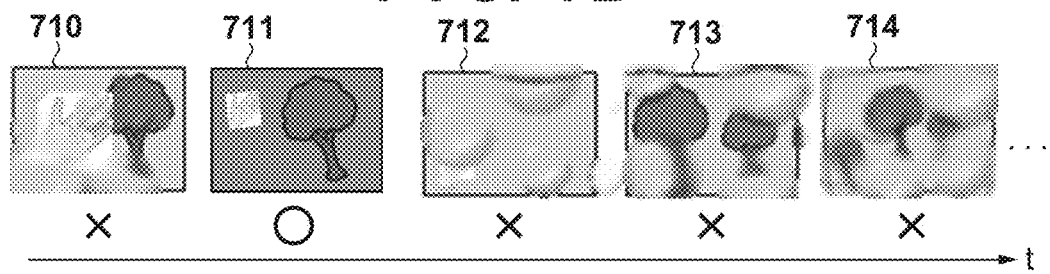

Also, when the actual environment cannot be correctly captured such as in a case when a liquid adheres to the lens due to rainfall or the like, an adverse effect occurs in the position and orientation estimation when such camera images are registered to the image database 104. Stabilization/precision improvement of the camera position and orientation estimation is possible even in cases when a liquid adheres to the lens at a time of initialization and during operation of the app by performing the selection determination and the registration determination considering liquid adherence to the lens as illustrated in FIG. 7A through 7B. In such cases, a distribution of regions in which liquid adheres to the lens is estimated and the size of the regions in which there is liquid adherence, which is an estimation result, being less than or equal to a threshold is made to be one of the determination conditions of the selection determination or the registration determination for example. A known technique can be used such as the method recited in "Miyahara Takayuki, Tamatsu Yukimasa, Kurihata Hiroyuki, Takahashi Tomokazu, Mekada Yoshito, Ide Ichiro, Murase Hiroshi: "Rainfall Recognition for Various Conditions Using an In-vehicle Camera Image for Driver Assistance", DENSO Technical Review, Vol. 12, No. 1, pp. 50-57, 2007. (hereinafter, referred to as D7)", for example, to estimate the distribution of the region in which a liquid adheres to the lens. Note, the estimation of the distribution of regions of adherence of liquid to the lens is performed by the detection unit 102.

FIG. 7A illustrates a state of selection determination performed in the image selection unit 121 and FIG. 7B illustrates a state of registration determination performed in the registration determination unit 122. In FIG. 7A, camera images 700, 701, and 702 are not selected as a camera image for initialization and are not registered to the image database 104 because the estimated region in which there is liquid adherence is greater than or equal to a fixed value. Meanwhile, a camera image 703 is registered to the image database 104 because the region in which liquid adherence is less than the fixed value. Also, FIG. 7B, camera images 710, 712, 713, and 714 are not registered to the image database 104 because the estimated region in which liquid adherence is greater than or equal to the fixed value. Meanwhile, a camera image 711 is registered to the image database 104 because the region in which liquid adherence is less than the fixed value.

Also, when the position and orientation of the camera are different, there are cases in which a specular reflection object adversely influences the construction of the image database 104 even if the same object is imaged because there is a characteristic that the outer appearance thereof does not match. Accordingly, stabilization/precision improvement of the camera position and orientation estimation is possible even in an environment in which a mirror or a glass surface exists by performing a selection determination or a registration determination that considers the region of the specular reflection object within the camera image. In such a case, registration of a camera image is performed, for example, making the size of the region of the specular reflection object being less than or equal to the threshold be one of the determination conditions of the selection determination and the registration determination. For example, detection of the region of the specular reflection object is realized, in a case of a display of a four-sided shape, by affixing tape of a color determined in advance to surround the periphery, and detecting a rectangle from the camera image. It is possible to use a known technique such as a rectangle detection method as a method for detecting the rectangle from the camera image.

As described above, by virtue of the first variation, stability of a camera position and orientation estimation can be improved even in an environment in which image blurring occurs. Also, stability of a camera position and orientation estimation can be improved even in an environment in which a liquid adheres to the lens of the camera. Furthermore, stability of a camera position and orientation estimation can be improved even in an environment where there is a specular reflection object. Note, it goes without saying that a blur amount or a region in which a liquid adheres to the lens as described above may be combined as appropriate as a criteria of the selection determination or the registration determination.

<Second Variation>

Although determination (selection determination and registration determination) of whether or not to register each image is performed by providing some kind of determination criteria when registering a camera image to the image database 104 in the first and second embodiments, limitation is not made to this. For example, configuration may also be taken such that every camera image is registered in the image database 104 and determination of whether or not each pixel of the registered camera images is used in the position and orientation estimation processing is performed. For example, pixels determined to be the moving object region are excluded from being targeted in the calculation of the database update processing (step S307 of FIG. 3) and camera position and orientation estimation processing (step S308) in a case when camera images including a moving object region are registered to the image database 104 in the first embodiment. By this, the time of initialization processing can be shortened and also a database updating operation can be optimized.

As described above, by virtue of the second variation, initialization processing when performing a camera position and orientation estimation can be accelerated and also the time for acquiring an image registered in the database can be shortened.

Third Embodiment

Figure 8:
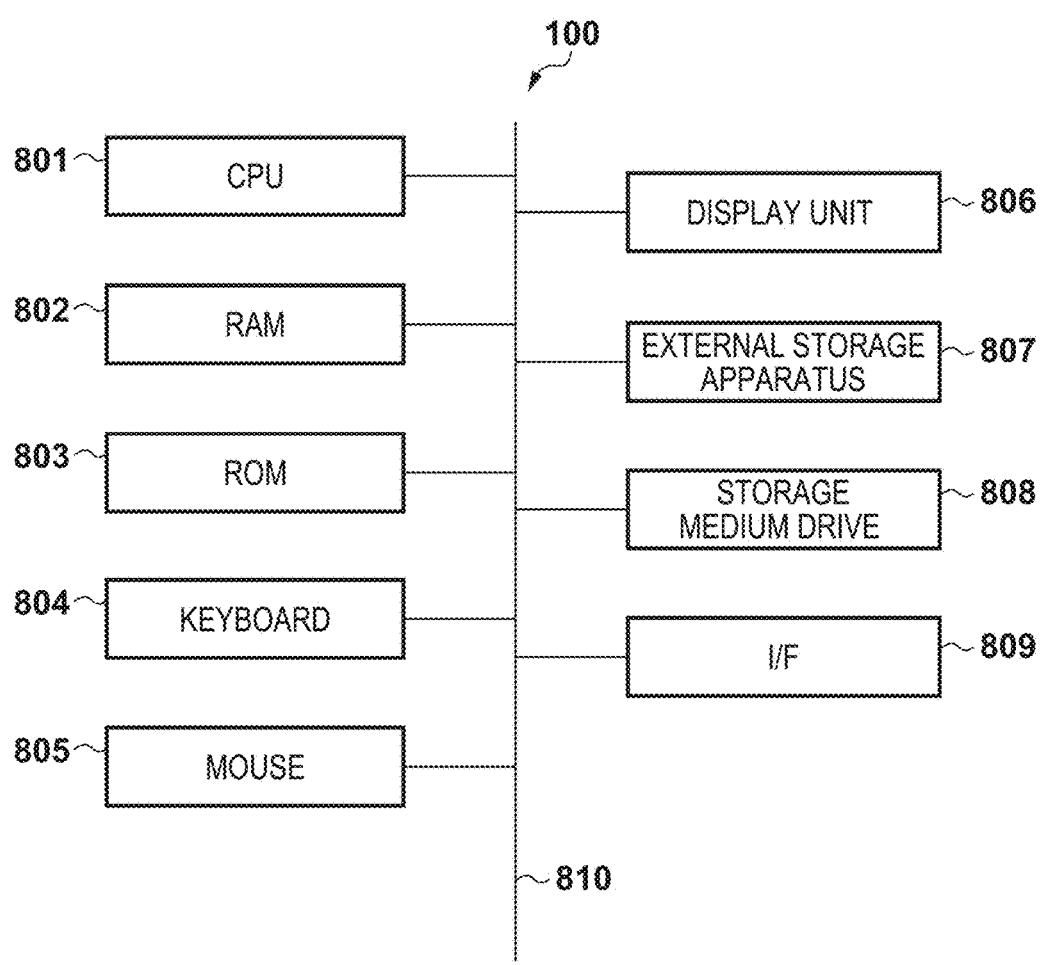
FIG. 8 is a block diagram illustrating an example of a hardware configuration of the information processing apparatus 100.

Some or all of the functions of each unit configuring the information processing apparatus 100 (FIG. 1) of the first and the second embodiments may be realized by hardware or realized by software. For example, by causing a computer to execute predetermined software implemented as hardware, the computer realizes each part of the information processing apparatus 100 described in the embodiments described above, and the above described operations are performed. FIG. 8 is a block diagram illustrating an example of a hardware configuration of the information processing apparatus 100.

A CPU 801 uses a program or data stored in a RAM 802 or a ROM 803 to perform control of the whole computer, and execute each process described as something that the information processing apparatus 100 performs in each of the embodiments described above. The RAM 802 has a region for temporarily storing programs and data loaded from an external storage apparatus 807 or a storage medium drive 808. Furthermore, the RAM 802 has an area for temporarily storing data received from an external apparatus via an I/F (interface) 809. The external apparatus is the imaging unit 180 for example.

Furthermore, the RAM 802 also has a work area used when the CPU 801 executes each process. Specifically, the RAM 802 can provide various areas as appropriate. Setting data, a boot program, or the like of the computer are stored in the ROM 803. A keyboard 804 and a mouse 805 are examples of operation input apparatuses and input various instructions according to an operation of a user to the CPU 801. A display apparatus 806 is configured by a display and can display processing results by the CPU 801 in an image, characters, or the like. The display apparatus 806 may function as the display unit 190.

The external storage apparatus 807 is a large capacity information storage device as typified by a hard disk drive device. An OS (operating system), programs for causing the CPU 801 to execute each process described above as something that the information processing apparatus performs, and data are stored in the external storage apparatus 807. In the corresponding programs, programs that respectively correspond to the configurations of the information processing apparatus are included. Also, in this data, what is described as known information in the foregoing description is included. Programs and data saved to the external storage apparatus 807 are loaded to the RAM 802 as appropriate in accordance with a control by the CPU 801. The CPU 801 executes each process described above as something the information processing apparatus performs by using the loaded programs and data to execute the processing.

The storage medium drive 808 reads data and program stored in a storage medium such as a CD-ROM or a DVD-ROM, and writes data and programs to a corresponding storage medium. Note, some or all of the programs and data described as being stored in the external storage apparatus 807 may be stored to the storage medium. Programs and data that the storage medium drive 808 reads from the storage medium are outputted to the external storage apparatus 807 or the RAM 802.

The I/F 809 is configured by an analog video port or a digital input/output port such as IEEE 1394 for making a connection to the imaging unit 180, by a DVI port for outputting a combined image to the display apparatus 806, or the like. Data received via the I/F 809 are inputted to the RAM 802 or the external storage apparatus 807. Note, some of the functions of the image acquisition unit 101 illustrated in FIG. 1 are realized by the I/F 809. Reference numeral 810 is a bus connecting each part described above.

As described above, by virtue of the above described embodiment, referencing unsuitable images in a position and orientation estimation of an imaging apparatus is prevented and stability of the position and orientation estimation of the imaging apparatus is improved.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-074599, filed Apr. 1, 2016, which is hereby incorporated by reference herein in its entirety.

What is claimed is:

1. An information processing apparatus comprising:
a memory storing instructions; and
a processor configured to implement the instructions and execute a plurality of tasks, including:
an acquisition task that acquires an image that is imaged by an imaging apparatus;
a detecting task that detects an occurrence of a factor that influences a position and orientation estimation relating to the image acquired by the acquisition unit task;
a determining task that determines whether or not to register the image based on the factor detected by the detecting task in an image database for estimating the position and orientation of the imaging apparatus from the image acquired by the acquisition task; and
a constructing task that constructs the image database using a group of images determined to be registered.

2. The apparatus according to claim 1, wherein the detecting task detects as the factor a region of a moving object that exists in the image acquired by the acquisition task.

3. The apparatus according to claim 2, wherein the detecting task detects, as the moving object, at least one of a hand of a person, a leg or foot of a person, a cable, or a person.

4. The apparatus according to claim 1, wherein the detecting task detects, as the factor, an amount of blurring of the image.

5. The apparatus according to claim 4, wherein the detecting task detects the amount of blurring based on the image acquired by the acquisition task.

6. The apparatus according to claim 5, wherein the amount of blurring is an amount of motion blur or defocus blur.

7. The apparatus according to claim 4, the amount of blurring is an amount of motion blur detected based on a signal of an acceleration sensor or an angular velocity sensor provided on the imaging apparatus.

8. The apparatus according to claim 1, wherein the detecting task estimates an adherence of liquid to a lens from the image acquired by the acquisition task, and detects the factor based on the estimation result.

9. The apparatus according to claim 1, wherein the detecting task detects the factor based on a detection result of a specular reflection object in the image acquired by the acquisition task.

10. The apparatus according to claim 1, wherein the determining task makes a determination condition for registration of an image for initialization in the image database differ from a determination condition for registration of images acquired in sequence by the acquisition task after the registration of the image for initialization.

11. The apparatus according to claim 1, wherein the determining task further makes one determination condition for registering an image be that the size of a region of a known shape object whose shape is known beforehand is greater than or equal to a predetermined value in the image acquired by the acquisition task.

12. The apparatus according to claim 11, wherein the known shape object is a two-dimensional planar marker.

13. The apparatus according to claim 1, wherein the constructing task:
reconstructs a three-dimensional structure of an actual environment using a group of images determined to be registered by the determining task, and
stores each image of the group of images in the image database in association with three-dimensional information based on the reconstructed three-dimensional structure.

14. The apparatus according to claim 1, the plurality of tasks include:
an estimating task that estimates the position and orientation of the imaging apparatus based on the image acquired by the acquisition task and the group of images registered in the image database; and
a generating task that generates a mixed reality image based on the position and orientation estimated by the estimating task and the acquired image.

15. An information processing apparatus comprising:
a memory storing instructions; and
a processor configured to implement the instructions and execute a plurality of tasks, including:
an acquisition task that acquires a camera image that is imaged by an imaging apparatus;
a detecting task that detects a blur region that influences a position and orientation estimation in the camera image;
a constructing task that constructs an image database used to estimate the position and orientation of the imaging apparatus from a camera image using a group of camera images acquired by the acquisition task,
wherein the constructing task reconstructs a three-dimensional structure of an actual environment using parts of the acquired group of camera images, which are registered in the image database, except for the blur region detected by the detecting task, and stores each camera image of the acquired group of camera images in association with three-dimensional information based on the three-dimensional structure.

16. The apparatus according to claim 15, wherein the detecting task detects a region of a moving object that exists in the image acquired by the acquisition task.

17. The apparatus according to claim 16, wherein the detecting task detects, as the moving object, at least one of a hand of a person, a foot of a person, a cable, or a person.

18. A method of controlling an information processing apparatus, the method comprising the steps of:
acquiring an image that is imaged by an imaging apparatus;
detecting an occurrence of a factor that influences a position and orientation estimation relating to the acquired image;
determining whether or not to register the image based on the detected factor in an image database for estimating the position and orientation of the imaging apparatus from the image acquired by the acquiring step; and
constructing the image database for estimating the position and orientation of the imaging apparatus from the acquired image using a group of images determined to be registered.

19. A method of controlling an information processing apparatus, the method comprising the steps of:
acquiring a camera image that is imaged by an imaging apparatus;
detecting a blur region that adversely influences a position and orientation estimation in the camera image;
constructing an image database used to estimate the position and orientation of the imaging apparatus from a camera image using an acquired group of camera images,
wherein the construction step reconstructs, a three-dimensional structure of an actual environment using parts of the acquired group of camera images, which are registered in the image database, except for the blur region detected by the detecting step, and stores each camera image of the acquired group of camera images in association with three-dimensional information based on the three-dimensional structure.

20. A non-transitory computer readable storage medium storing a program executable by a computer to execute a method of controlling an information processing apparatus, the method comprising the steps of:
acquiring a camera image that is imaged by an imaging apparatus;
detecting a blur region that influences a position and orientation estimation in the camera image;
constructing an image database used to estimate the position and orientation of the imaging apparatus from a camera image using an acquired group of camera images,
wherein the construction step reconstructs, a three-dimensional structure of an actual environment using parts of the acquired group of camera images, which are registered in the image database, except for the blur region detected by the detecting step, and stores each camera image of the acquired group of camera images in association with three-dimensional information based on the three-dimensional structure.

* * * * *